April 1, 1952 S. KRASNOW ET AL 2,590,873
METHOD AND APPARATUS FOR MEASURING RADIOACTIVITY
Filed Oct. 24, 1939 3 Sheets-Sheet 1

INVENTORS
Shelley Krasnow
Leon F. Curtiss
By Shelley Krasnow
Attorney

INVENTORS
Shelley Krasnow
Leon F. Curtiss
BY
ATTORNEYS.

INVENTORS
Shelley Krasnow
Leon F. Curtiss
BY
ATTORNEYS.

Patented Apr. 1, 1952

2,590,873

UNITED STATES PATENT OFFICE 2,590,873

METHOD AND APPARATUS FOR MEASURING RADIOACTIVITY

Shelley Krasnow, New York, N. Y., and Leon F. Curtiss, Montgomery County, Md., assignors, by mesne assignments, to Schlumberger Well Surveying Corporation, Houston, Tex., a corporation of Delaware Application October 24, 1939, Serial No. 301,078

36 Claims. (Cl. 250—83.6)

In application Serial No. 137,380, filed April 16, 1937, entitled "Method and Apparatus for Measuring Radioactivity," there is described and claimed apparatus and methods of geophysical exploration in which radioactive properties of the formations encountered at different depths inside a drill hole, are measured, and variation of said properties with depth are determined.

This invention relates to an improved method and apparatus for measuring radioactivity, and has particular reference to a method and apparatus for measuring radioactivity in inaccessible locations, such as in bore-holes or at considerable depths in bodies of water.

One object of the invention is to provide a method and apparatus useful for locating deposits of minerals having radioactive properties. Another object of the invention is to provide an apparatus by which one may measure radioactive properties continuously from the top to the bottom of a bore-hole, and have both an immediate indication, and a permanent record, of the radioactivity at various depths.

In locating deposits of radioactive minerals it is often the custom to drill a number of bore-holes in localities where such deposits might exist. It is further the practice to bring samples or cores of the drilled material to the surface of the earth, and there examine them for radioactivity by well known methods and apparatus. This method has several drawbacks. First, a deposit of ore may exist close to the bore-hole, but not be traversed by it, by which the deposit will be missed. Second, it is possible to make an error in ascertaining the exact depth from which a core or sample has been taken. Finally, it is rarely possible to bring all of the core to the surface, a certain percentage always being lost in the drilling or handling.

It is further known that deposits of petroleum are often markedly radioactive as compared with the surrounding rock material. This is believed to be due to the superior absorptive property of petroleum for radium emanation. Natural gas and ground water are also known to be somewhat more radioactive than their surrounding rock material. In drilling for either petroleum or natural gas, or ground water, it is desirable to know the exact level at which the strata having these are traversed by the drilled hole. This is often difficult to determine, particularly when drilling has been done by the "rotary" method, in which the use of mud under pressure tends to wall off the strata. Often too, the drilled hole will be lined with a metallic casing, which casing by accident or intention may seal off strata having the desired fluid.

It is the intention in the present invention to provide an apparatus so sensitive, and a method appropriate to its use, that the relatively faint radioactivity of oil and ground water may be detected in place in a bore-hole. An apparatus sensitive enough to serve this function will by its nature differentiate between the different though faint radioactivities of the rock material. Rock materials, dependent upon their origin and dependent upon the minerals contained in them, have different radioactivities. Thus, it has been found that granite, shales having organic materials embodied therein, sedimentary rocks containing zircon, and rock materials having mica associated with them, are all slightly more radioactive than for example limestone or chalk deposits. Sandstones will differ in their natural radioactivity, depending upon the minerals contaminating them. Organic deposits, such as coal, oil and natural gas, as mentioned above, petrified vegetable matter, etc., will show higher radioactivities than for instance limestone and chalk. Thus, with an apparatus as sensitive as that described herein it will be possible to differentiate between different layers of rock by the differences in their radioactivities. Each layer in an area will have a characteristic radio activity, just as it has a characteristice chemical composition, and for the same reason. Thus, the radioactivity of a layer will serve as a variety of marker, serving to identify the layer wherever it might be in an area.

It thus becomes possible to identify rock layers in different bore-holes drilled in an area and thus correlate the strata.

Further objects of the invention described are to obviate the difficulties mentioned and secure the advantages mentioned above.

Reference is had to the accompanying drawings in which.

Figures 1, 2, 3:
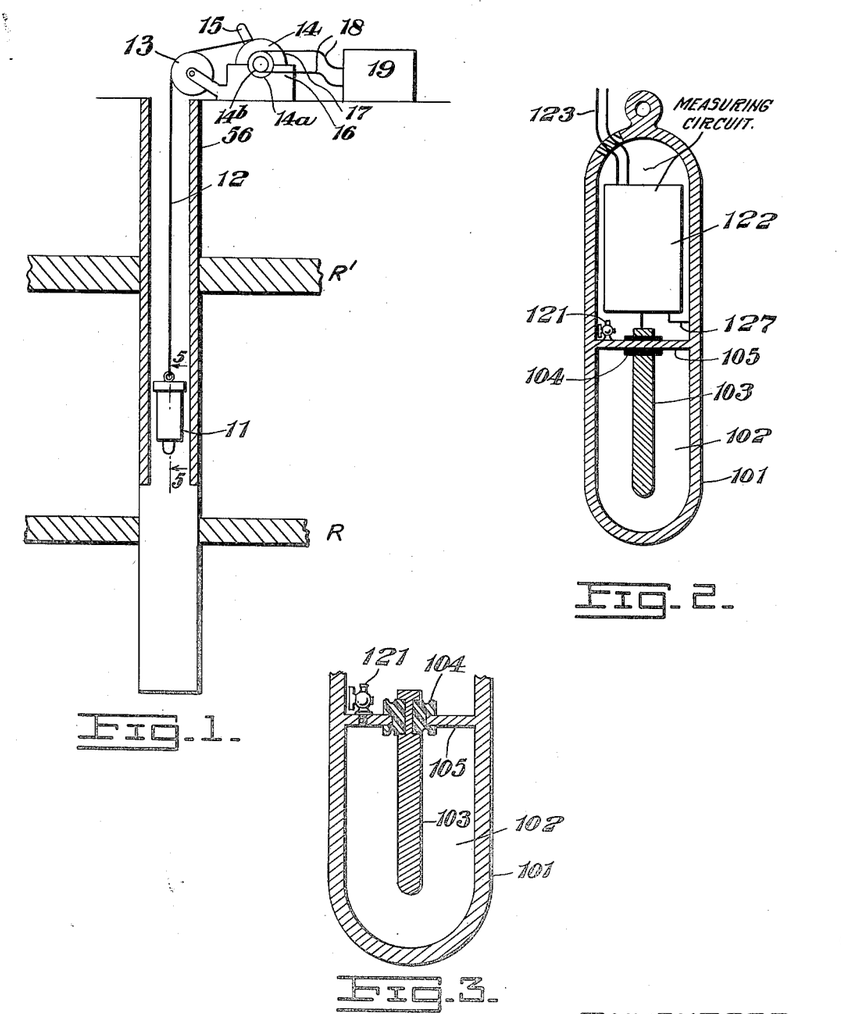
Figure 1 shows a convenient form of apparatus for measuring radioactivity at various depths in a bore-hole.
Figure 2 shows a type of apparatus for measuring radioactivity at various depths and giving an immediate indication at the surface of the ground of the value of the radioactive intensity.
Figure 3 shows a detail of the lower portion of the apparatus shown in Figure 2.

A convenient form of the apparatus shown in Figure 1 employs a cartridge 11 suspended in the bore-hole by a conducting cable 12. The cable 12 passes over a measuring wheel 13 and thence onto a reel 14 operated by a crank 15. A pair of slip-rings 14a and 14b fastened to the shaft of the reel 14 have bearing upon them the brushes 16 and 17. These brushes are connected through the medium of wires 18, 18, to a recording element 19.

This assemblage when provided with the detecting elements hereinafter described will serve to measure radioactive intensities within a bore-hole. If a metallic casing such as 56 exists in the bore-hole the presence of a radioactive layer such as R' may nevertheless be noted because of the easy penetration of the rays through the thickness of metal ordinarily employed for casing. A measuring apparatus which may be employed in the cartridge 11 is shown in Figure 2. This consists of a cartridge 101, which is provided with a gas-tight partition 105 and a gas-filled space 102. Located preferably centrally within the space 102 is an electrode 103, carefully insulated by means of amber or other low leakage insulating material 104. In the partition 105 is mounted a valve 121 by which gas may be introduced to attain any desired pressure within the enclosure 102, after which the valve 121 may be shut and the said pressure maintained. The wall 101 is made of strong material, as thin as possible to reduce the absorption of rays of radioactive material passing into the space 102. A material which will combine strength and transparency to rays from radioactive substances is utilized. Suitable materials are: magnesium alloys, aluminum alloys such as Duralumin, beryllium, or beryllium alloys. A very thin steel housing may be used, the greater strength allowing the material to be so thin that absorption is not serious. The space 102 may be filled with any one of a number of gases. A suitable gas for this purpose is nitrogen, although other gases may be used with almost equally good results.

Figure 3 shows the details of the lower portion of the apparatus shown in Figure 2, directing particular attention to the insulation employed. It is of advantage to rib or corrugate the surface of the insulation as shown, to increase the leakage path. Although element 121 is shown as a valve, in practice it may be advantageous to use a standard type of sealed-off glass joint, as employed in the glass blowing art.

The pressure in the ionization chamber is preferably higher than atmospheric so as to give a greater ionization current, as will be familiar to those versed in the art. A pressure of several hundred pounds per square inch will be found suitable. The voltage across the chamber is made as high as possible so as to obtain an increased ionization for a given change in intensity of ionizing rays. The voltage is limited, however, by the fact that if it is made too high, ionization by collision will result and the chamber will support a steady discharge regardless of the intensity of ionizing rays in its vicinity. The value of the resistance is such as to cause an easily measurable voltage drop across its terminals for the usual intensity of ionizing rays. Its value will be chosen with regard to this and with regard to the requirements of the voltage indicating device. Good results may be obtained with a resistance having a value comparable and preferably approximately equal to the effective resistance of the ionization chamber. Suitable values are: a battery voltage of 130, and a resistance value of 10 megohms.

In the apparatus shown in Figure 2 the information is transmitted to the surface through wires 123, allowing immediate observation at the surface, as well as recording. The central electrode 103 of the ionization chamber is connected to element 122 which represents schematically the electrical apparatus more fully shown hereinafter. A lead 127 is connected to metallic casing 101 serving to ground certain of the elements employed in the apparatus 122. Leads 123 extend to the surface of the ground, where they may pass over a wheel such as 13, onto a reel such as 14 provided with slip rings such as 14a and 14b. Connecting wires such as 16 and 18 serve to connect to frequency measuring apparatus, substituted for element 19 shown in Figure 1.

Figure 4:
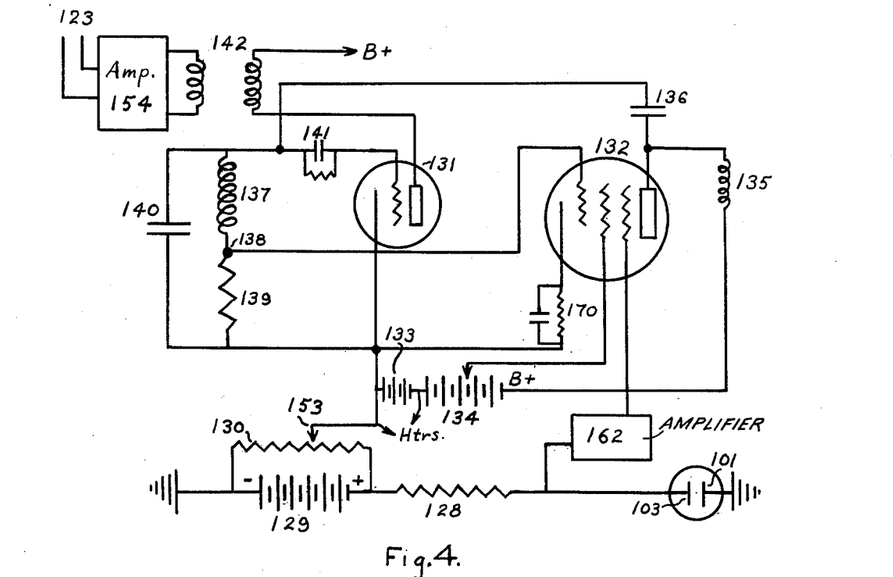
Figure 4 shows the electrical circuit suitable for use in the modification shown in Figure 2.

Referring now to Figure 4, 101 and 103 represent the elements of the ionization chamber. The side 101 is grounded, while the electrode 103 is connected to one terminal of a high resistance 128. The other terminal of resistance 128 is connected to the positive end of a high voltage battery 129, the negative end of this battery being grounded. A potentiometer 130 is connected across the terminals of battery 129, with its movable contact 153 connected to the cathode of a triode vacuum tube 131. A lead joins electrode 103 and the grid of a pentode vacuum tube 132. While a pentode is shown in the specific embodiment disclosed, any multi-element tube having three or more elements, and having the proper characteristics, may be used.

A conventional battery 133 is shown to provide the heater current for the tubes. A "B" battery 134 is shown connected to battery 133 and leading to choke 135, the other terminal of the choke being connected to the plate of tube 132. A tap is taken off battery 134 to provide the screen grid voltage for tube 132. The plate of tube 132 is connected through condenser 136 to inductance 137. Inductance 137 terminates at terminal point 138 to which is connected one end of resistor 139. The other end of resistor 139 is connected to contact 153 as shown.

Across inductance 137 and resistance 139 is placed a condenser 140. The common terminal point 138 is connected to a grid of vacuum tube 132. While connection to a specific grid has been indicated, it is also possible to connect a lead from terminal 138 to the cathode of tube 132 or to any other element except the plate of the same tube, with satisfactory results. It will be understood that proper biasing means will be utilized for the specific type of tube chosen.

The cathode of tube 132 is connected through a conventional self-biasing arrangement 170 to the contact 153. The grid of tube 131 is connected through a conventional self-biasing arrangement 141 to inductance 137. The plate of tube 131 is connected to the primary of a coupling transformer 142, the other end of the primary being connected to the "B" battery as shown. The secondary of coupling transformer 142 may be connected to leads which are brought directly to the surface of the bore-hole and which are connected to a suitable frequency or other measuring device, such as 19. A suitable frequency can be chosen, high enough to be easily measurable, and low enough to avoid difficulties due to capacity and inductance effects along the transmitting cable.

Figure 5:
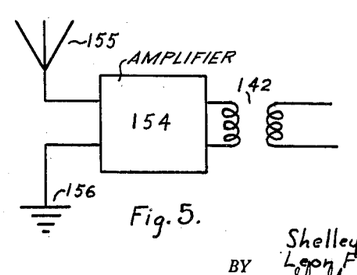
Figure 5 shows a modification of Figure 4 for radio transmission to the surface of the ground.

The coupling transformer may be connected to an amplifier such as 154, the amplifier feeding into the external cable as shown. The amplifier will be found particularly valuable in preventing external load variations from reacting on the principal circuit and thus causing a disturbing change of frequency. Alternatively, the amplifier may feed directly into an antenna and ground arrangement, or into what is equivalent, a dipole radiating system of a type common to those versed in the radio art. This modification is shown schematically in Figure 5, 155 being the antenna or its equivalent and 156 being the ground or its equivalent. It will be understood that for this modification, a suitable radio frequency will preferably be employed.

Figures 6, 12, 13:
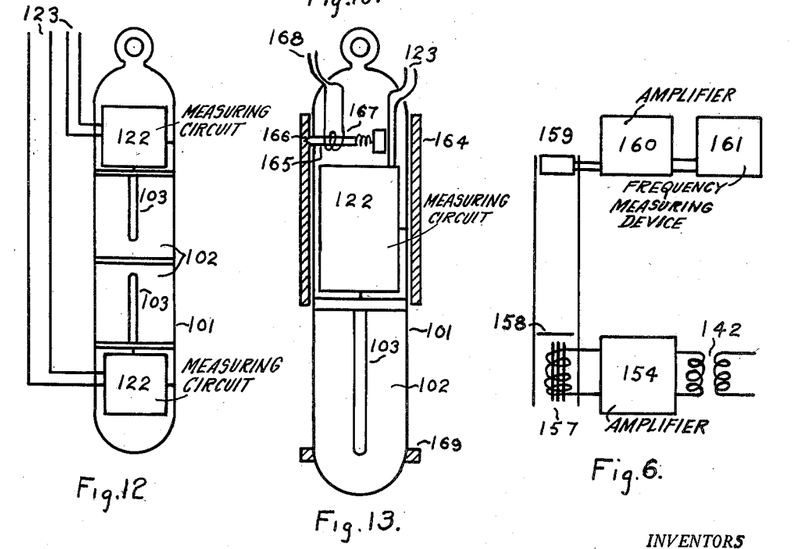
Figure 6 shows schematically a system for conveying information to the surface of the ground by means of mechanical waves.
Figure 12 shows a modification of the apparatus indicated in Figure 11 to render measurements of radioactivity more dependable.
Figure 13 shows an apparatus for measuring radioactive intensity with the interposition of a filter.

As a still further alternative, as shown in Figure 6 the amplifier 154 may feed into an electromagnetic vibrator or sounding device, having an electromagnet 157 and an armature or diaphragm 158. The alternating current output of the amplifier 154 will serve to cause an alternating magnetic field of equivalent frequency in electromagnet 157, which will cause the mechanical vibration of armature 158. If this armature is made to vibrate with sufficient amplitude, the mechanical vibrations caused thereby may be made strong enough to allow their transmission to the surface of the earth where they can be detected by a detector device such as a microphone 159, amplified by amplifier 160, and their frequency measured by frequency measuring device 161. It will be understood that the constants in the circuit shown in Figure 4 will be chosen in the case aforementioned so as to give a frequency approximately within the audio-frequency range. The frequency may be made quite low, even below the audible frequency. This may be done either by selection of the proper constants of the circuit shown in Figure 4, or by the use of a "scaling" or subharmonic frequency device, incorporated with amplifier 154. A low frequency system may be used in place of element 161.

While Figure 4 discloses an apparatus for generating a frequency in proportion to the intensity of radioactivity, it will be understood that an apparatus utilizing phase shift or amplitude variation as a function of radioactive intensity, may be used instead of one employing frequency variation.

An amplifying stage 162 may be inserted in the lead from element 103 of the ionization chamber to the grid of tube 132. This will be a direct current amplifier, and will serve to increase the voltage change on the grid for a given change in potential on element 103. Where the change in potential on element 103 is sufficient to cause a proper voltage change of the grid, the amplifier 162 may be omitted, and a direct connection made between the lead 103 and the grid element.

The operation of the circuit may be described as follows: The elements 137, 139, and 140, together with tube 131, biasing arrangement 141, and the proper "A" and "B" voltage supplies, constitute an oscillatory circuit whose natural frequency is dependent on the values of inductance 137, condenser 140, and resistance 139.

There will be an alternating voltage across the terminals of resistance 139, which voltage will be in phase with the current flowing through the resistor. This voltage will be impressed between the cathode and one grid of tube 132, and will cause in general an alternating voltage of the same frequency between the grid and plate of tube 132. The voltage across resistor 139 is 90° out of phase with that across 137. Consequently, the voltage impressed by vacuum tube 132 across inductance 137 will also be 90° out of phase with the voltage in inductance 137. The magnitude of this voltage will be dependent upon the amplification due to tube 132. Any out-of-phase voltage across inductance 137 will have the effect of changing the apparent value of the inductance and will thereby cause a change in the frequency generated by the oscillatory circuit.

Any increase in radioactive intensity will alter the effective resistance between the electrodes 101 and 103. Through the agency of battery 129, an increased current will flow through the circuit composed of battery 129, resistance 128, and electrodes 101 and 103. This increased current will cause a greater voltage drop between terminals of resistance 128, which increased voltage drop, after amplification by amplifier 162, will be impressed across the cathode and a grid of tube 132. If the screen grid voltage has been properly adjusted, any change in the potential of the grid connected to amplifier 162, will cause a change in the effective amplification factor of tube 132. This change, as described previously will cause a change in the out-of-phase voltage impressed across inductance 137 and will thereby cause a change in the natural frequency of the oscillatory circuit described herein. The alternating current flowing through inductance 137 will induce voltages of equal frequency in transformer 142 and consequently in amplifier 154.

It is therefore seen that an alteration of radioactive intensity will cause a related and functionally connected change in frequency in the output of amplifier 163.

The voltage of battery 129 should be so chosen as to obtain the maximum ionizing effect without actual breakdown, and the value of resistance 128 should be of such value as to cause a significant voltage change across the cathode and grid of tube 132. The values of the constants in the remainder of the circuit should be chosen so that with the voltage changes normally obtained across the cathode and grid of tube 132, a sufficient change in frequency will be obtained in the output.

While a variety of vacuum tubes may be used for elements 131 and 132, a suitable set will be had by using an RCA type #957 tube as element 131 and an RCA type #959 tube as element 132. Suitable values for the other elements are as follows:

| | |
|---|---|
| 129 | 135 volts |
| 134 | 135 volts |
| 128 | 10 megohms |
| 170 | 1800 ohms and .01 mf. |
| 136 | .002 mf. |
| 137 | 700 microhenrys |
| 140 | 20 mmf. |
| 141 | 50,000 ohms and .0005 mf. |
| 139 | 100 ohms |

As described herein, the frequency may vary over a wide range, depending upon the particular mode of transmission of information to the surface. A suitable frequency is one megacycle.

Figure 7:
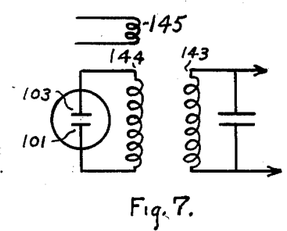
Figure 7 shows a circuit for causing a change in frequency with change of radioactive intensity.

Figure 7 shows still another modification making use of alternating currents only across the electrodes 101 and 103 of the ionization chamber. 143 represents the inductance of the plate resonant circuit of a standard vacuum tube oscillator. The mode of construction of such an oscillator will be well understood by those versed in the art and no further explanation thereof need be given here. Inductance 144 constitutes an element which is inductively coupled to element 143. One terminal of inductance 144 is connected to electrode 103, while the other terminal is connected to the terminal 101 of the ionization chamber. The elements of the circuit should be so proportioned that the maximum voltage developed across elements 101 and 103 will be of the proper value for the particular mode of construction and particular pressure utilized in the ionization chamber. The circuit constants are further chosen so as to give the desired frequency, which may be any usual audio or radio frequency. Any change in the conductivity of the gas between elements 101 and 103 will cause an altered current to flow in inductance 144. This will have the effect of altering the natural frequency of the system composed of the plate resonant circuit and the inductively coupled element 144. This frequency may be transmitted to any other inductively coupled element 145, which element will serve the function of the secondary of transformer 142.

Suitable values employed in the above modification are a voltage of between 100 and 150 volts across the elements of the ionization chamber, and a natural frequency in the vicinity of two megacycles in the oscillatory circuit.

Figure 8:
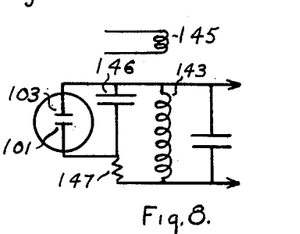
Figure 8 shows still another circuit serving the same function as that shown in Figure 7.

Another system which may be employed is shown in Figure 8. Here element 143 is an inductive element in the plate resonant circuit of a conventional vacuum tube oscillator. Across the terminals of this inductance are connected condenser 146 and resistance 147 in series. Across the terminals of condenser 146 are connected the elements 103 and 101. Any change in the current flowing between electrodes 101 and 103 will cause an alteration in the effective natural frequency of the system composed of the elements shown. This change may be detected in an additional inductively coupled element 145, which again may be connected in place of the secondary of transformer 142.

Figure 9:
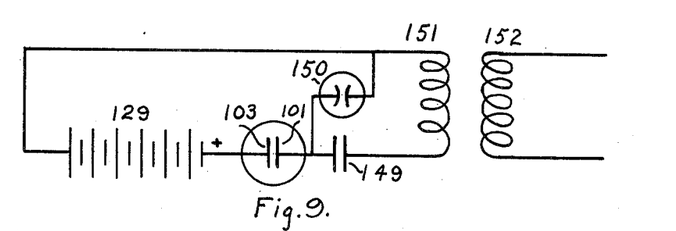
Figure 9 shows still another circuit, utilizing a glow discharge lamp, and serving to vary the generated frequency in relation to the change in radioactive intensity.

Still another modification may be utilized for obtaining a frequency change in radioactivity in the vicinity of elements 101 and 103. This is shown in Figure 9. Here high voltage battery 148, is connected with its positive end to element 103 of the ionization chamber. Element 101 is connected to one terminal of condenser 149, the other terminal being connected to one end of the primary 151 of a transformer. The other terminal of the primary 151 is connected to a glow discharge lamp 150, the other terminal of the discharge lamp being connected to element 101.

In operation a current will flow between electrodes 101 and 103 depending upon the ionizing effect of rays in the vicinity thereof. This current will serve to charge condenser 149 at a rate dependent upon the relation between the capacity of condenser 149 and the effective impedance of the gas between elements 101 and 103. As soon as the potential difference across the terminals of condenser 149 reaches the ignition voltage of glow lamp 150, a discharge will take place in the glow lamp and the voltage across condenser 149 will drop to the extinguishing voltage of glow lamp 150. Thereupon, the charging of condenser 149 will again commence and will proceed until the voltage reaches the ignition voltage of glow lamp 150 at which time the cycle will be repeated as before. The oscillations in the circuit including the primary of transformer 151 will be transferred inductively to secondary 152 from which it can be transmitted to the surface of the ground or used in other ways to signal in the same manner as shown for the secondary of transformer 142.

Figure 10:
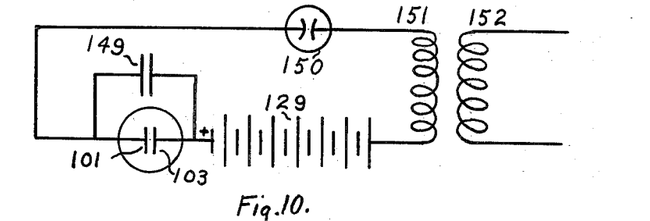
Figure 10 shows a modification of the circuit shown in Figure 9.

A further modification making use of a glow discharge lamp is shown in Figure 10. Here element 103 is connected to the positive end of a high voltage battery 129, the negative end of the battery being connected to the primary 151 of a transformer. The other end of the primary is connected to one terminal of a glow discharge lamp 150, the other terminal of the glow discharge lamp being connected to terminal 101. Across the terminals 101 and 103 is placed a condenser 149.

The operation of this circuit is analagous to that of the modification shown in Figure 9, the difference in impedance of the ionization chamber causing a different frequency of discharge of the glow discharge lamp. The pulses thus generated are transmitted to the secondary 152 as before.

It will be understood that if a glow lamp is used as the discharge device it will flicker at a rate dependent upon the radioactive intensity in the vicinity of the ionization chamber. The rate of flicker may be observed visually if the glow lamp is at an accessible locality. The rate of flicker may also be observed indirectly by photographic means. Thus the glow lamp may be allowed to record on a photographic film. A series of streaks will be obtained on the photographic film, the number of streaks per unit length of film being directly related to the radioactive intensity. The glow lamp may further be allowed to act upon a photocell, thereby generating a frequency in the photocell circuit directly related to the frequency of the flashes. Where the photocell has an integrating action with respect to time, the intensity of current flowing in the photocell will be directly related to the frequency of discharge of the glow lamp.

It is further to be noted that a glow lamp may be substituted for element 142 in the circuit embodiment shown in Figure 4. The frequency of discharge of the glow lamp will then be a measure of the frequency generated in the associated circuit and will therefore be a measurement of the radioactive intensity in the vicinity of the ionization chamber. The glow lamp in this case also may be caused to act upon a photographic device or photocell as described above.

Though a glow discharge lamp has been mentioned as a proper circuit element in the modifications shown in Figures 9 and 10, it will be appreciated that in its place may be substituted another element having non-linear negative resistance characteristics.

Figure 11:
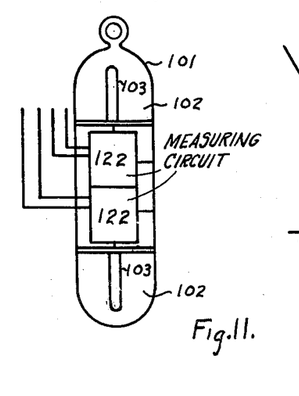
Figure 11 shows an apparatus for measuring radioactive gradient.

Figure 11 shows an apparatus which may be utilized to measure what may be termed as the radioactive gradient along the length of a borehole. This apparatus is comprised of elements such as shown in Figure 16 in duplicate, and mounted at a substantial axial distance from each other. Each unit is connected to its associated measuring circuit 122, the outputs of the two circuits being each connected to separate frequency measuring systems at the surface of the ground. The two frequency measuring systems may be interconnected so as to superpose one frequency on the other and give the difference of the two frequencies as a result. In this way a measure will be obtained of the relative radioactivity of the rock materials at the respective levels of each of the ionization chambers. Thus the gradient or rate of change of radioactivity may be detected.

This modification will permit further distinguishing the actual radioactivities of the strata from the possible individual erratic behavior of each of the measuring elements.

If the latter feature is sought rather than the actual measurement of gradient of radioactivity, the measuring elements may be placed close together and their combined effect noted.

This modification is shown in Figure 12.

Figure 13 shows a modification suitable for measurement of radioactive intensity through a filter. It will be understood that in certain areas little contrast will be noted in radioactive intensity throughout the length of the bore-hole. Advantage may be taken of the fact that different radioactive materials emit rays having different distributions of intensity in the radioactive spectrum. Thus, if a layer in the bore-hole is contaminated with thorium, the total intensity recorded on the apparatus may be the same as that for a layer contaminated with radium. However, if measurements be taken with a filter, the intensity due to radium will appear greater than that due to thorium, and the difference may be noted. The filter may also be found particularly valuable in cases where radioactive material is used as an indicator, as will be hereinafter described. Different materials may be introduced in the bore-hole, each having different radioactive properties. They may later be identified by measurements taken with a filter.

The apparatus shown in Figure 13 illustrates an outer cylindrical shield or filter 164 completely surrounding the cartridge 101. A latch 165 is held by a spring in an indentation 166 in the filter. This latch may be operated by a solenoid 167 actuated by wires 168 which pass to the surface of the bore-hole. On passing an energizing current through wires 168, solenoid 167 will cause latch 165 to be withdrawn from indentation 166, allowing filter 164 to drop till it strikes the circumferential stop 169.

With filter 164 in the raised position, the apparatus will operate as previously described. The only filtering action will be that of the cartridge, and which is intrinsic in the material used. If it is desired to take the measurement with a filter, the energizing current can be applied while the apparatus is in the bore-hole, which will cause the filter to assume an operative position, after which a further measurement can be taken. With the filter 164 against stop 169 all rays entering the ionization chamber radially will have to pass through the filter. Since most of the rays enter the chamber in this way, the equivalent of a nearly complete filter will be obtained.

The filter may be made of any metal or substance having the desired absorbing properties. Examples of suitable materials are copper, lead, aluminum, etc. It is understood that the filter may be incorporated with the cartridge 101, and be made permanent, in which case only the filtered rays will impinge on the instrument.

There will be a special advantage in the utilization of the filter about one of the units shown in Figure 11 or 12. Here a differential result will be obtained, giving to the observer the difference between the filtered and unfiltered rays. Alternatively, filters may be used about both of the elements shown in Figures 11 and 12, a different filter being used about each element. By successive runs, with different pairs of filters, the data collected will be of greater value than that obtained by the mere measurement of unfiltered radiation.

The apparatus forms disclosed herein, may be made extremely sensitive to the rays emitted by radioactive substances and so the sometimes faint radioactivity of petroleum, natural gas and ground water detected. As has been pointed out previously, this may be done in spite of any covering of mud or of metallic casing intervening between the walls of the borehole and the cartridge 11. It is in fact, possible to run the cartridge 11 inside of the standard drill pipe used in rotary drilling and thus make measurements with a minimum of disturbance to drilling. Because of the limited absorptive power of the metals customarily used for drilling, it will be possible to detect radioactive rays through the thickness of metal in the drill pipe, or even through the several inch thickness of the drilling tools.

While, from what has been disclosed above, it is evident that strata may be differentiated from each other by means of the quantitative difference in the amount of associated radioactive material, it will be appreciated that strata need not necessarily be widely different in their associated radioactivity to enable one to differentiate them from one another. In cases where the associated radioactivities are not conspicuously different in conducting measurements from one end of the bore-hole to the other, valuable information may still be obtained by considering the manner in which the radioactivity varies, or phrased differently, the function by which radioactive intensity changes as the depth is altered. This will be found particularly valuable in searching for oil deposits. It will be recalled that petroleum deposits in the natural state have water associated with them. In many cases the water underlies the petroleum, and will have a radioactivity markedly different from that of the petroleum itself. Thus if an apparatus as described above, were lowered past a formation, a sudden change would be observed in passing from rock to petroleum, another sudden change in passing from petroleum to water, and still another sudden change in passing from water to rock. The layers might thus be easily identifiable despite the fact that their radioactivity may be no greater or less than that of most of the rock lining the borehole.

In certain localities, petroleum in particular may be found to have a limited radioactivity; so limited that detecting its presence with the apparatus shown becomes difficult. In these cases advantage may be taken of the superior absorptive power of petroleum for radium emanation gas. Radium emanation gas may be introduced at the surface of the bore-hole, being pumped into it so as to reach the lowest level. The borehole may then be cleaned out with a suitable fluid, such as water, and a test made for radioactivity in the manner described previously. It will be seen that if any petroleum exists in the bore-hole, it will absorb radium emanation gas in greater proportion than the other strata, and will therefore exhibit a stronger radioactivity.

While radon gas has been mentioned as a suitable material it will be appreciated that other substances having radioactive properties may be used instead. Such other substances may be radioactive salts, either those having a natural radioactivity or those having an artificially excited radioactivity. It is only necessary for the purpose of the invention that the substance used be selectively absorbed by the layer of interest within the bore-hole.

It will further be appreciated that in some cases the lack of absorption of the radioactive materials by a layer will serve to identify the layer. In still other cases, the absorption, due to a layer, may be so great, that the area in the region of the layer will be denuded of radioactive material, and will appear less radioactive than the areas in which the absorption is less. In all cases, however, the differences between layers will be identifiable by the differences in residual radioactivity.

It is obvious that any other means than those shown or described may be used to convey the frequency of the impulses produced by the apparatus, to the surface.

The elements employed in the member 11 may be combined with a perforating tool as ordinarily used for perforating casing in oil, gas or water wells. With this it will be possible to lower the apparatus slowly until an indication of radioactivity is received. The apparatus may then be stopped and the perforating procedure carried on as usual. This will have the advantage of eliminating the inaccuracy usually made in measurement. Heretofore, it has been the custom to measure the depth to the level in question, then run the perforator to that depth. This involved two measurements, the combined error of which was at times sufficient to cause perforation to be performed at the wrong level. The method described above can have none of these errors, since it is not dependent in any way on a measurement of depth.

The scope of the invention is defined by the appended claims.

We claim:

1. An apparatus for indicating a change in voltage comprising, an oscillatory circuit including a plurality of electrical impedances, means connected to the said oscillatory circuit for injecting thereinto a voltage that is out-of-phase with respect to the voltage developed across one of said impedances so as to change the apparent value of one of the impedances in the oscillatory circuit by a variable amount, and additional means responsive to voltage change and serving to control said injecting means to vary proportion of apparent change of the said last-named impedance in the oscillatory circuit, the change in impedance causing a change in frequency of oscillation.

2. In an apparatus for measuring radioactive properties a plurality of elements so related as to constitute a generator of sustained electrical oscillations, the natural frequency of the generator being dependent on the physical constants of the said elements, at least one of the elements being sensitive to radioactivity and having its physical constants dependent upon the intensity of radioactivity in its vicinity, the change in physical constants causing a change in the natural frequency of the oscillatory circuit, the frequency generated serving as a measure of radioactive properties.

3. In a method of measuring radioactivity, the steps of applying an alternating voltage across an ionization chamber, of allowing the effective impedance of the ionization chamber to be altered by the intensity of radioactivity in its vicinity, and of further causing the altered impedance to react upon the generator or alternating voltage so as to cause a change in the characteristics of the said alternating voltage, which change will be related to the intensity of radioactivity in the vicinity of the ionization chamber.

4. In an apparatus for measuring radioactive properties in a deep narrow borehole, a long narrow cartridge including an apparatus for indicating a change in voltage comprising, an oscillatory circuit, means connected to the said oscillatory circuit and adapted to change the apparent value of one of the impedances in the oscillatory circuit by a variable amount, and additional means responsive to voltage change and serving to vary the proportion of apparent change of the said impedance in the oscillatory circuit, the change in impedance causing a change in frequency of oscillation, said additional means responsive to voltage change being actuated by an element sensitive to radioactivity.

5. In an apparatus for measuring radioactive properties, a plurality of elements so related as to constitute a generator of sustained electrical oscillations, the natural wave characteristics of the generator being dependent on the physical constants of the said elements, at least one of the elements being sensitive to radioactivity and having its physical constants dependent upon the intensity of radioactivity in its vicinity, the change in physical constants causing a change in the natural wave characteristics of the oscillatory circuit, the characteristics generated serving as a measure of radioactive properties.

6. In an apparatus for measuring radioactive properties in a deep narrow borehole, a long narrow cartridge including a plurality of elements so related as to constitute a generator of sustained electrical oscillations, the natural frequency of the generator being dependent on the physical constants of the said elements, at least one of the elements being sensitive to radioactivity and having its physical constants dependent upon the intensity of radioactivity in its vicinity, the change in physical constants causing a change in the natural frequency of the oscillatory circuit, the frequency generated serving as a measure of radioactive properties in the said borehole.

7. In a method of measuring radioactivity in a deep narrow borehole, the steps of generating sustained electrical oscillations of predetermined wave characteristics, the said characteristics being dependent on the physical constants of the generating system of said oscillations, and at least one of said physical constants being dependent upon the intensity of radioactivity in its vicinity, of altering said physical constant by the intensity of the radioactivity within the borehole, the change in said physical constant causing a change in the predetermined characteristics of the electrical oscillations, the altered characteristics serving as a measure of radioactive properties in said borehole.

8. In a method of measuring radioactivity in a deep narrow borehole, the steps of lowering an ionization chamber within said borehole responsive to radioactivity therein, of applying an alternating voltage across said ionization chamber, of allowing the effective impedance of the ionization chamber to be altered by the intensity of radioactivity in its vicinity, and of further causing the altered impedance to react upon the generator of alternating voltage so as to cause a change in the characteristics of the said alternating voltage, which change will be related to the intensity of radioactivity in the vicinity of the ionization chamber within said borehole.

9. In a geophysical exploration device including an instrument for measuring in situ radioactive phenomena characteristics of geological formations and means for producing a varying electrical current proportionally related in its magnitude of variation to measurements of radioactivity made by said instrument, and a remotely located recorder for recording the measurements, the improvements that comprise, means to generate oscillations, means to modulate said oscillations in accordance with the said varying current and means for transmitting the modulated oscillations to the recorder for operation of the same.

10. In an apparatus for measuring radioactivity within a borehole, a holder of narrow lateral dimensions capable of fitting within the borehole and being lowered to various depths therein, an electrical system mounted upon the holder adapted to provide oscillations of a substantially periodic nature, an ionization chamber comprising part of the said system containing electrodes within a gas and having means to charge the said electrodes relative to each other, so that the leakage current flowing between the said electrodes will be proportional to the radioactivity in the vicinity, means connected to the said ionization chamber and forming part of the said system, acting upon the remainder of the said system to determine the frequency of the oscillations provided thereby proportionally to the leakage current flowing between the said electrodes, whereby the said frequency will be a measure of the said leakage current, means to transmit the said oscillations to the surface of the earth, and means at the surface of the earth to produce a record indicative of the frequency of the said oscillations.

11. In an apparatus for measurment of radioactivity at depths within a bore hole, a narrow holder capable of fitting within the borehole and being lowered to various depths therein, an ionization chamber mounted upon the holder, the said ionization chamber having electrodes in a gas, and adapted to have a current flowing therein proportionally related to the radioactivity proximate thereto, a source of electrical energy for connection into a complete closed circuit containing the ionization chamber for charging the electrodes thereof, a separate circuit for transmission of responses to the surface of the earth, the said separate circuit being adapted to develop and transmit oscillations, means responsive to the current flow within the ionization chamber, and acting upon the said separate circuit to relate the frequency of the oscillations developed therein to the current flow within the ionization chamber, and means at the surface of the earth to receive the said oscillations and record the frequency thereof.

12. An apparatus for measuring in a borehole a radioactive property of a formation traversed thereby comprising a bomb adapted to be lowered in the borehole, a cable for suspending said bomb carrying an electrical conductor, an oscillator in said bomb arranged to deliver a carrier wave to said conductor, means adapted to be placed at the surface and connected to said conductor for recording the output of said oscillator, and means functionally independent of said carrier wave carried by said bomb responsive to the radioactive property to be measured and connected to said oscillator in such a way as to control the frequency of its carrier wave whereby variations in said frequency may be taken as a measure of said radioactive property.

13. A method of geophysical prospecting that comprises obtaining measurements of radiation from surrounding geological strata in a well bore or similar opening in the ground, converting the measurements into proportionally related mechanical vibrations, transmitting the mechanical vibrations to the surface and recording at the surface the measurements from the vibrations.

14. A method of geophysical prospecting that comprises obtaining measurements of radiation from surrounding geological strata in a well bore or similar opening in the ground, converting the measurements into proportionally related mechanical vibrations, transmitting the mechanical vibrations to the surface and recording at the surface the measurements from the vibrations in correlation with a determination of the depth at which the measurements were obtained.

15. A method of geophysical prospecting that comprises obtaining measurements of radiation from surrounding geological strata in a well bore or similar opening in the ground, continuously generating mechanical vibrations at the place where the measurements are obtained, altering the vibrations with indications of the measurements, transmitting the vibrations to the surface, and recording the measurements from the vibrations.

16. A method of geophysical prospecting that comprises obtaining measurements of radiation from surrounding geological strata in a well bore or similar opening in the ground, continuously generating mechanical vibrations at the place where the measurements are obtained, altering the frequency of the mechanical vibrations in accordance with the measurements obtained, transmitting the mechanical vibrations to the surface of the earth and recording the measurements derived from the mechanical vibrations.

17. A method of geophysical prospecting that comprises determining the natural radioactivity of formations adjacent a well bore or similar opening in the ground at various depths in the opening, continuously generating mechanical vibrations at the place where the determinations are being made, altering the frequency of the vibrations in accordance with the measurement, transmitting the altered mechanical vibrations to the surface of the earth, simultaneously determining the position of the measuring instrument in the opening and recording the alteration of the mechanical vibrations in correlation with determination of depth.

18. A device for geophysical prospecting that comprises means for measuring radiation from adjacent formations and adapted to be lowered into a drill hole or other opening in the earth, means adapted to be lowered therewith and to generate mechanical vibrations, means to alter said vibrations in accordance with the measurements gathered, means to transmit the vibrations to the surface of the earth, and means to record the alterations of said mechanical vibrations at the surface of the earth.

19. In a device for geophysical prospecting which includes means for measuring radiation from surrounding geological strata in a drill hole or other opening in the earth, means to support the measurement gathering means in the opening, and means to record the measurements gathered on the surface, the improvement that comprises means to transmit the measurements from the measurement gathering instrument to the recorder including means to convert the measurements into proportionally related mechanical vibrations at the measurement gathering means and means to reconvert the mechanical vibrations into indications of the measurements at the surface.

20. A method for measuring a radioactive property of a formation traversed by a borehole, which comprises, generating adjacent said formation a signal which is a function of said radioactive property, also generating adjacent said formation an oscillating carrier wave, utilizing said signal for varying at least one characteristic of said oscillating wave, transmitting said oscillating wave to the surface, and there determining the variation in the selected characteristic thereof affected by said signal.

21. A method for measuring a radioactive property of a formation traversed by a borehole, which comprises, generating adjacent said formation a signal which is a function of said radioactive property, also generating adjacent said formation an oscillating carrier wave, utilizing said signal for varying the frequency of said oscillating wave, transmitting said oscillating wave to the surface, and there determining the variation in the selected characteristic thereof affected by said signal.

22. A method for measuring the gamma-ray activity of a formation traversed by a borehole, which comprises, generating adjacent said formation a signal which is a function of said gamma-ray activity, also generating adjacent said formation an oscillating carrier wave, utilizing said signal for varying at least one characteristic of said oscillating wave, transmitting said oscillating wave to the surface, and there determining the variation in the gamma-ray activity thereof affected by said signal.

23. A method as in claim 20 in which the measurements are recorded in correlation with a determination of the depth at which the measurements were obtained.

24. A method as in claim 13 in which the radiation is nuclear in nature.

25. An apparatus as in claim 18 in which the means for measuring radiation is a nuclear energy detecting means.

26. An apparatus as in claim 19 in which the means for measuring radiation measures nuclear radiation.

27. In a geophysical exploration device including an instrument for measuring in situ radioactive phenomena characteristic of geological formations and means for producing a varying electrical current proportionally related in its magnitude of variation to measurements of radioactivity made by said instrument, and a remotely located recorder for recording the measurements, the improvements that comprise, means to generate oscillations, means to modulate said oscillations, said modulating means being electrically interconnected with the means for producing a varying electrical current so as to be responsive thereto and to connect said producing means by purely electrical connections to the generating means, and means for transmitting the modulated oscillations to the recorder for operation thereof.

28. In an apparatus for measuring radioactive properties within a borehole, a plurality of elements so related as to constitute a generator of sustained electrical oscillations, the natural wave characteristics of the generator being dependent on the physical constants of the said elements, at least one of the elements being sensitive to radioactivity, having its physical constants dependent on the intensity of radioactivity in its vicinity and being mounted upon a narrow holder so as to be lowerable to a depth within the borehole, the change in physical constants causing a change in natural wave characteristics in the oscillatory circuit, said characteristics thereby serving as a measure of the radioactive properties, and means to transmit the said oscillations to the surface of the earth, there to provide an indication of the radioactivity at a depth within the borehole.

29. A method as in claim 7 in which the physical constant dependent upon the intensity of radioactivity is affected by the radioactivity at a depth within the borehole and the altered characteristics of the oscillations are transmitted to the surface of the earth, there to indicate the radioactivity at said depth.

30. In an apparatus for the measurement of nuclear energy within a borehole, a holder of narrow lateral dimensions capable of fitting within the borehole and being lowered to various depths therein, an electrical system mounted upon the holder having an output and adapted to give thereat substantially periodic oscillations, the said system including a member sensitive to the intensity of nuclear energy proximate thereto, means to energize electrically the elements of the said member, means responsive to the electrical condition of the said member as modified by the nuclear energy and adapted to act upon the remainder of the system to determine the frequency of the said oscillations, means connected to the output to transmit the said oscillations to the surface of the earth and means at the surface of the earth to provide a record of the frequency in correlation with depth.

31. In an apparatus for measuring nuclear energy within a borehole, a holder of narrow lateral dimensions capable of fitting within the borehole and being lowered to various depths therein, an electrical system mounted upon the holder adapted to provide oscillations of a substantially periodic nature, said system including an ionization chamber containing electrodes within a gas, the disposition of the electrodes and the type and pressure of gas being so chosen that the said chamber when charged will support a stable ionization current whose value is related to the nuclear energy, a voltage source connected to the said chamber to establish an electrical potential difference between the said electrodes so that the electric current flowing therebetween will be related to the nuclear energy in the vicinity of the holder, means responsive to the electrical condition of the said chamber additionally connected thereto, whereby the said electrical condition will be proportional to the ionization current flowing, the electrical condition responsive means acting upon the remainder of the said system to determine the frequency of the oscillations provided thereby proportionally to the current flowing between the said electrodes, whereby the said frequency will be a measure of the said current, means to transmit the said oscillations to the surface of the earth and means at the surface of the earth to produce a record indicative of the frequency of said oscillation.

32. In a method of measuring nuclear energy at a depth within a borehole, the steps of establishing a stable electric current within a medium, said medium having a variable electrical property dependent upon and related to the nuclear energy received therein, of exposing said medium to the nuclear energy at a depth within the borehole, of receiving said energy within the said medium, whereby an electrical property of the said medium will be modified in accordance with the said energy, of providing a substantially periodic oscillation at a depth within the borehole, proximate to the point of exposure of said medium, of modifying the frequency of the oscillation in accordance with the said electrical property of the medium, of transmitting the oscillation to the surface of the earth and there recording the frequency in correlation with the depth at which the nuclear energy was sensed.

33. A method for obtaining indications of the radioactive properties of formations traversed by a bore hole which comprises, generating at longitudinally spaced apart points in the bore hole signals which are functions of said radioactive properties of the adjacent formations, also generating adjacent said formations a plurality of oscillating electric carrier waves, utilizing said signals for varying at least one characteristic of said oscillating waves, respectively, transmitting said oscillating waves to the surface, and there determining the variations in the selected characteristics of said waves affected by said respective signals.

34. A method for obtaining indications of the radioactive properties of formations traversed by a bore hole which comprises, generating at longitudinally spaced apart points in the bore hole signals which are functions of said radioactive properties of the adjacent formations, also generating adjacent said formations a plurality of oscillating electric carrier waves, utilizing said signals for varying the frequencies of said oscillating waves, respectively, transmitting said oscillating waves to the surface, and there determining the variations in the frequency of said waves affected by said respective signals.

35. A method for obtaining indications of the gamma ray activity of formations traversed by a bore hole which comprises, generating at longitudinally spaced apart points in the bore hole signals which are functions of said gamma ray activity of the adjacent formations, also generating adjacent said formation a plurality of oscillating electric carrier waves, utilizing said signals for varying the frequencies of said oscillating waves, respectively transmitting said oscillating waves to the surface, and there determining the variations in the frequency of said waves affected by said respective signals.

36. In a geophysical exploration device, the combination of a plurality of longitudinally spaced apart instruments for measuring in situ radioactive phenomena characteristic of geological formations, means for producing a plurality of varying electrical currents proportionally related in their magnitudes of variation to measurements of radioactivity made by said instruments, respectively, remotely located recording means for recording the measurements, means for generating a plurality of oscillations, means for modulating said oscillations in accordance with said varying currents, respectively, and means for transmitting the modulated oscillations to the recording means for operation of the same.

SHELLEY KRASNOW.
LEON F. CURTISS.

REFERENCES CITED

The following references are of record in the file of this patent:

UNITED STATES PATENTS

| Number | Name | Date |
|---|---|---|
| 2,018,080 | Martienssen | Oct. 22, 1935 |
| 2,081,041 | Kott | May 18, 1937 |
| 2,133,776 | Bender | Oct. 18, 1938 |
| 2,161,979 | Rovner | June 13, 1939 |
| 2,197,453 | Hassler | Apr. 16, 1940 |
| 2,219,273 | Scherbatskoy | Oct. 22, 1940 |
| 2,219,274 | Scherbatskoy | Oct. 22, 1940 |
| 2,225,668 | Subkow et al. | Dec. 24, 1940 |
| 2,421,423 | Krasnow | June 3, 1947 |
| 2,425,868 | Dillon | Aug. 19, 1947 |

FOREIGN PATENTS

| Number | Country | Date |
|---|---|---|
| 248,581 | Germany | June 26, 1912 |
| 329,304 | Germany | June 14, 1919 |
| 180,819 | Great Britain | June 8, 1922 |
| 340,231 | Great Britain | Dec. 12, 1930 |

OTHER REFERENCES

"Radiology," vol. 27, pp. 149–157, 1936 (2).
"Physical Review," vol. 43, June 1, 1933, pp. 871 to 874.